United States Patent
Kodama et al.

(10) Patent No.: US 9,156,462 B2
(45) Date of Patent: Oct. 13, 2015

(54) DRIVE CONTROL APPARATUS FOR VEHICLE

(71) Applicants: Shinya Kodama, Toyota (JP); Motonari Ohbayashi, Nisshin (JP); Yuki Minase, Toyota (JP); Masashi Takagi, Nagoya (JP); Toshihiro Takagi, Toyota (JP)

(72) Inventors: Shinya Kodama, Toyota (JP); Motonari Ohbayashi, Nisshin (JP); Yuki Minase, Toyota (JP); Masashi Takagi, Nagoya (JP); Toshihiro Takagi, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 379 days.

(21) Appl. No.: 13/688,548

(22) Filed: Nov. 29, 2012

(65) Prior Publication Data

US 2013/0143716 A1 Jun. 6, 2013

(30) Foreign Application Priority Data

Dec. 2, 2011 (JP) ................................. 2011-264984

(51) Int. Cl.
| | |
|---|---|
| B60W 10/04 | (2006.01) |
| B60W 10/06 | (2006.01) |
| B60W 10/115 | (2012.01) |
| B60W 30/184 | (2012.01) |
| F16H 61/04 | (2006.01) |
| F16H 63/50 | (2006.01) |

(52) U.S. Cl.
CPC ............... *B60W 10/04* (2013.01); *B60W 10/06* (2013.01); *B60W 10/115* (2013.01); *B60W 30/1846* (2013.01); *B60W 2510/0604* (2013.01); *B60W 2510/101* (2013.01); *B60W 2520/04* (2013.01); *B60W 2520/10* (2013.01); *B60W 2540/16* (2013.01); *B60W 2710/0666* (2013.01); *F16H 2061/0488* (2013.01); *F16H 2063/508* (2013.01); *Y10T 477/677* (2015.01)

(58) Field of Classification Search
None
See application file for complete search history.

(56) References Cited

U.S. PATENT DOCUMENTS 5,833,572 A * 11/1998 Leising et al. ................. 477/113
2010/0006358 A1 1/2010 Ishikawa

FOREIGN PATENT DOCUMENTS

| JP | 61-190135 A | 8/1986 |
|---|---|---|
| JP | 2010-018174 A | 1/2010 |
| WO | 2012/176323 A1 | 12/2012 |

* cited by examiner

*Primary Examiner* — Erin D Bishop
(74) *Attorney, Agent, or Firm* — Sughrue Mion, PLLC

(57) ABSTRACT

A drive control apparatus for a vehicle includes: a control unit that controls drive force output from an engine in accordance with operation of an accelerator pedal; and a shift mechanism capable of selectively switching a shift position to a driving position or a non-driving position. The shift mechanism transmits the drive force to wheels when the shift position is in the driving position, and interrupts transmission of the drive force when the shift position is in the non-driving position. The control unit executes a drive force restriction process of reducing the drive force when the shift position is switched from the non-driving position to the driving position while the accelerator pedal is in an on state, and, when the switching is from a neutral position, the control unit changes a mode of reducing the drive force in accordance with a continuation time of the neutral position.

2 Claims, 6 Drawing Sheets

DRIVE CONTROL APPARATUS FOR VEHICLE

INCORPORATION BY REFERENCE

The disclosure of Japanese Patent Application No. 2011-264984 filed on Dec. 2, 2011 including the specification, drawings and abstract is incorporated herein by reference in its entirety.

BACKGROUND OF THE INVENTION

1. Field of the Invention

The invention relates to a drive control apparatus for a vehicle that controls drive force output from a prime mover serving as a drive power source of a vehicle, in accordance with operation of an accelerator.

2. Description of Related Art

As described in Japanese Patent Application Publication No. 61-190135 (JP 61-190135 A), a vehicle, such as an automobile, has a control unit that controls drive force output from a prime mover in accordance with operation of an accelerator by a driver, and the drive force output from the prime mover is transmitted to wheels of the vehicle, whereby the vehicle runs. Furthermore, the vehicle is also provided with a shift mechanism that enables the driver to selectively switch a shift position to either a driving position or a non-driving position. When the shift position is in a driving position, drive force is transmitted from the prime mover to the vehicle wheels, whereas when the shift position is in a non-driving position, the transmission of drive force from the prime mover to the wheels is interrupted.

When the driver intends to start the vehicle from a stationary state, in general, the driver switches the shift position from a non-driving position to a driving position and then operates the accelerator from an off state to an on state. However, if the driver is in a hurry, there is a possibility that the driver may operate the accelerator to an on state before switching the shift position from a non-driving position to a driving position. In this case, although the driver intends to carry out the normal operation described above, in actuality, the driver carries out an operation that is different from the normal operation, by switching the shift position to a driving position while the accelerator is in an on state.

When the driver carries out an operation different from a normal operation in this way, there is a possibility that the actual behaviour of the vehicle may not match the behaviour of the vehicle that the driver is expecting. More specifically, while the driver intends to start the vehicle when he or she operates the accelerator to an on state, in actuality, the drive force of the prime mover is transmitted to the wheels and the vehicle starts off when the driver switches the shift position to a driving position, after having operated the accelerator to an on state. When the drive force of the prime mover is transmitted to the wheels after switching the shift position to a driving position while the accelerator is in an on state in this way, there is a possibility of giving an uncomfortable feeling to the drive.

SUMMARY OF THE INVENTION

The invention provides a drive control apparatus for a vehicle that makes it possible to suppress giving an uncomfortable feeling to a driver when the shift position is switched from a non-driving position to a driving position while the accelerator is in an on state.

A drive control apparatus for a vehicle according to an aspect of the invention includes: a control unit that is configured to control drive force output from a prime mover serving as a drive power source of a vehicle, in accordance with operation of an accelerator; and a shift mechanism capable of selectively switching a shift position to one of a driving position and a non-driving position, wherein: the shift mechanism is configured to transmit the drive force from the prime mover to vehicle wheels when the shift position is in the driving position, and to interrupt transmission of the drive force from the prime mover to the vehicle wheels when the shift position is in the non-driving position; the control unit is configured to execute a drive force restriction process of reducing the drive force output from the prime mover when the shift position is switched from the non-driving position to the driving position while the accelerator is in an on state; and the control unit is configured so that, in executing the drive force restriction process, when the switching of the shift position is from a neutral position, which is one of the non-driving positions, the control unit changes a mode of reducing the drive force in accordance with a continuation time of the neutral position, during which the shift position is in the neutral position.

According to this configuration, the control unit executes a drive force restriction process of reducing the drive force output from the prime mover when the shift position is switched from a non-driving position to a driving position while the accelerator is in an on state. Here, examples of circumstances where the shift position is switched from a non-driving position to a driving position while the accelerator is in an on state are: circumstances where the driver unintentionally operates the accelerator to an on state before switching the shift position, such as when the driver intends to start the vehicle hurriedly from a stationary state. In such circumstances, if the drive force of the prime mover is transmitted to the wheels when the shift position is switched from a non-driving position to a driving position while the accelerator is in an on state, there is a possibility of giving an uncomfortable feeling to the driver. In this respect, according to the configuration described above, the drive force restriction process described above is executed under such circumstances, thereby reducing the drive force output from the prime mover, and therefore the start of the vehicle is made moderate, and it is made possible to suppress giving an uncomfortable feeling to the driver.

When the shift position is switched to a driving position from the neutral position, which is one of the non-driving positions, while the accelerator is in an on state, this operation of the accelerator to an on state may be, for example, an operation of starting the vehicle from a temporary stationary state, or an operation of starting the vehicle to get the vehicle out of a muddy road. Therefore, if the mode of reducing the drive force in the drive force restriction process is made universal regardless of the circumstances of the vehicle, excess or deficiency may occur in the mode of reducing the drive force in the drive force restriction process, depending on the circumstances of the vehicle, and this may give an uncomfortable feeling to the driver.

Here, when the shift position is switched from the neutral position to a driving position while the accelerator is in an on state, if the operation of the accelerator to an on state is an operation of starting the vehicle from a temporary stationary state, for example, the continuation time of the neutral position, during which the shift position is in the neutral position, immediately before the shift position is switched to the driving position (hereinafter, referred to as the continuation time of the neutral position) is long. On the other hand, if the operation of the accelerator to an on state is an operation of starting the vehicle to get the vehicle out of a muddy road, the shift position is rapidly switched between the drive position and the reverse position, which are the driving positions, in order to move the vehicle backwards and forwards. Therefore, the continuation time of the neutral position is shorter than that in the case of an operation of starting the vehicle from a temporary stationary state as described above. In this way, the circumstances of the vehicle, in which a start operation has been performed, can be determined from the continuation time of the neutral position. According to the configuration described above, the mode of reducing the drive force in the drive force restriction process changes in accordance with the continuation time of the neutral position, and therefore the reduction amount of the drive force, and the like, is adjusted in accordance with the circumstances of the vehicle. Therefore, the occurrence of excess or deficiency in the mode of reducing drive force is prevented in the drive force restriction process, and it is possible to suppress giving an uncomfortable feeling to the driver.

Consequently, it is possible to reliably suppress giving an uncomfortable feeling to the driver when the shift position is switched from a non-driving position to a driving position with the accelerator being in an on state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
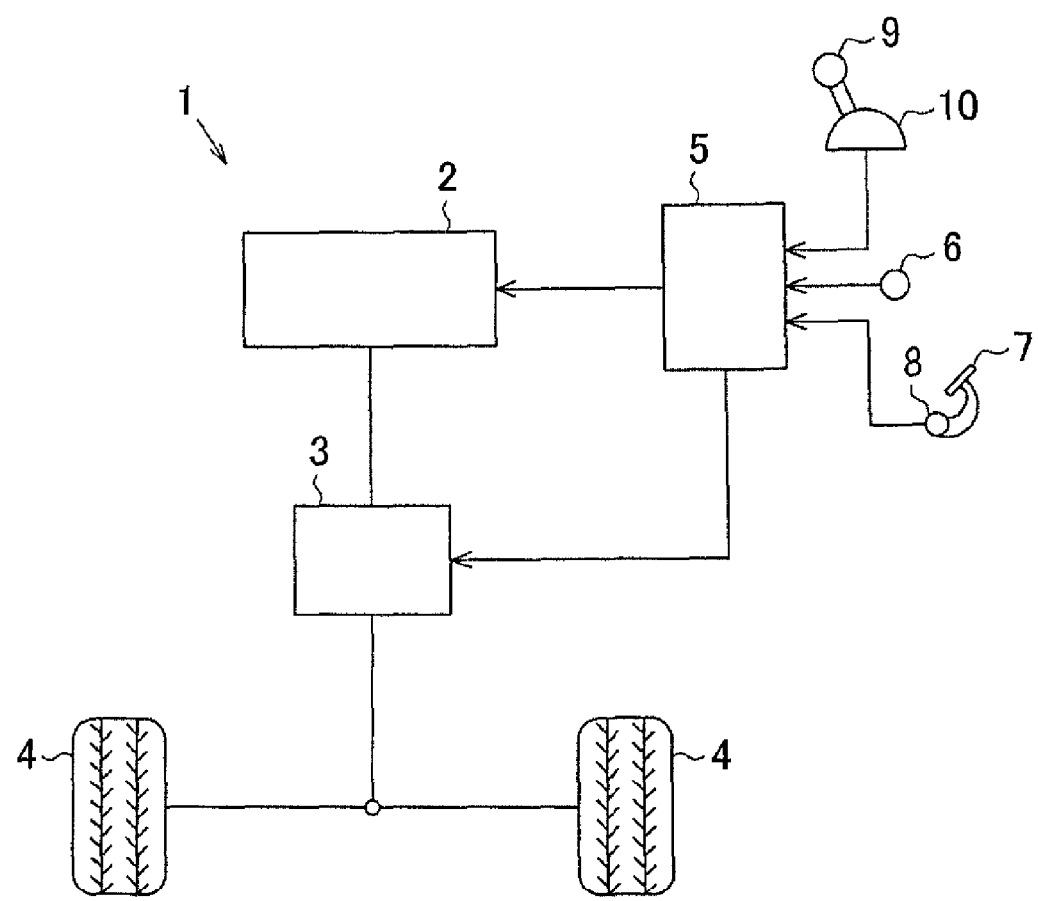
FIG. 1 is a schematic diagram showing a schematic configuration of a vehicle, in relation to a drive control apparatus for a vehicle according to one embodiment of the invention.

An embodiment of a drive control apparatus for a vehicle according to the invention will be described below with reference to FIGS. 1 to 6. As shown in FIG. 1, an internal combustion engine 2, which is a drive power source, and a transmission 3 that transmits drive force output from the internal combustion engine 2 to vehicle wheels 4, are mounted on a vehicle 1.

In addition, an electronic control apparatus 5 that executes various control procedures relating to the internal combustion engine 2 and the transmission 3 is mounted on the vehicle 1. The electronic control apparatus 5 includes a central processing unit (CPU) that carries out calculation processing relating to the various control procedures, a read-only memory (ROM), in which programs and data for the various control procedures are stored, a random-access memory (RAM) that temporarily stores the results of calculation processing, and the like. The electronic control apparatus 5 reads in detection signals from various sensors, executes various calculation processing, and controls the internal combustion engine 2 and the transmission 3 on the basis of the results of this processing.

The various sensors provided include a vehicle speed sensor 6 that detects the speed of travel of the vehicle 1 (hereinafter referred to as "vehicle speed SPD"), an accelerator operation amount sensor 8 that detects a depression amount of the accelerator pedal 7 (hereinafter referred to as "accelerator operation amount ACCP"), and a shift position sensor 10 that detects an operating position of a shift lever 9 (hereinafter referred to as "shift position PS").

The electronic control apparatus 5 adjusts the drive force output from the internal combustion engine 2 in accordance with the accelerator operation amount ACCP. Furthermore, the electronic control apparatus 5 commands a shift of the gear of the transmission 3 and commands transmission and interruption of the drive force between the internal combustion engine 2 and the wheels 4, on the basis of the accelerator operation amount ACCP, the vehicle speed SPD, and the shift position PS. Incidentally, the shift lever 9 can be switched to any one of a plurality of operating positions, such as a park position, a reverse position, a neutral position, and a drive position.

Drive modes of the transmission 3 in the respective operating positions of the shift lever 9 will be described below. When the shift lever 9 is switched to the park position, the transmission 3 is driven so that rotation of the wheels 4 is prohibited by meshing of gears in the transmission 3, and furthermore transmission of drive force output from the internal combustion engine 2 to the wheels 4 is interrupted.

When the shift lever 9 is switched to the neutral position, the transmission 3 is driven so that prohibition of the rotation of the wheels 4 by meshing of gears in the transmission 3 is cancelled, and furthermore transmission of drive force output from the internal combustion engine 2 to the wheels 4 is interrupted.

When the shift lever 9 is switched to the drive position, the transmission 3 is driven so that drive force output from the internal combustion engine 2 is transmitted to the wheels 4 in a forward rotating direction. Consequently, the vehicle 1 assumes a state, in which the vehicle 1 can travel forward.

When the shift lever 9 is switched to the reverse position, the transmission 3 is driven so that drive force output from the internal combustion engine 2 is transmitted to the wheels 4 in a reverse rotating direction. Consequently, the vehicle 1 assumes a state, in which the vehicle 1 can travel backward.

In other words, the park position and the neutral position correspond to a non-driving position, and the drive position and the reverse position correspond to a driving position. As mentioned above, when the driver intends to start the vehicle 1 from a stationary state, normally, the driver switches the shift position PS from a non-driving position to a driving position and depresses the accelerator pedal 7. In other words, the driver operates the accelerator pedal 7 from an off state to an on state. However, if the driver is in a hurry, there is a possibility that the driver may operate the accelerator pedal 7 to an on state, that is, depress the accelerator pedal 7, before switching the shift position PS from a non-driving position to a driving position. In this case, although the driver intends to carry out the normal operation described above, in actuality, the driver carries out an operation that is different from the normal operation, by switching the shift position PS to a driving position with the accelerator pedal 7 depressed.

When the driver unintentionally carries out an operation different from a normal operation in this way, there is a possibility that the actual behaviour of the vehicle 1 may not match the behaviour of the vehicle 1 that the driver is expecting. More specifically, while the driver intends to start the vehicle 1 when he or she depresses the accelerator pedal 7, in actuality, the drive force of the internal combustion engine 2 is transmitted to the wheels 4 and the vehicle 1 starts off when the driver switches the shift position PS to a driving position, after depressing the accelerator pedal 7. When the drive force of the internal combustion engine 2 is transmitted to the wheels 4 after switching the shift position PS to a driving position with the accelerator pedal 7 depressed in this way, there is a risk of causing the driver to feel uncomfortable.

Therefore, in the present embodiment, a drive force restriction process is executed via the electronic control apparatus 5 in order to reduce the drive force output from the internal combustion engine 2 when the shift position PS is switched from a non-driving position to a driving position with the accelerator pedal 7 depressed. Therefore, the drive force output from the internal combustion engine 2 is reduced, the start of the vehicle 1 is made moderate, and it is possible to suppress giving an uncomfortable feeling to the driver.

When the shift position PS is switched to a driving position from the neutral position, which is a non-driving position, with the accelerator pedal 7 depressed, the depression of the accelerator pedal 7 may be, for example, an operation of starting the vehicle 1 from a temporary stationary state, or an operation of starting the vehicle 1 to get the vehicle 1 out of a muddy road. Therefore, if the mode of reducing the drive force in the drive force restriction process is made universal regardless of the circumstances of the vehicle 1, an excessive shortfall may occur in the mode of reducing the drive force in the drive force restriction process, depending on the circumstances of the vehicle 1, which may give an uncomfortable feeling to the driver.

Therefore, in the present embodiment, when executing the drive force restriction process, if the switching of the shift position PS is from a neutral position, the mode of reducing the drive force is changed in accordance with the continuation time $\Delta t$ of the neutral position, during which the shift position PS is in the neutral position. Consequently, it is possible to reliably suppress giving an uncomfortable feeling to the driver when the shift position PS is switched from a non-driving position to a driving position with the accelerator pedal 7 depressed.

Next, an execution procedure of a drive restriction routine including a drive force restriction process is described in detail with reference to the flowchart in FIGS. 2A, 2B and 3. The series of processes shown in this flowchart are executed periodically by a time interrupt at prescribed time intervals, via the electronic control apparatus 5.

Figure 2A:
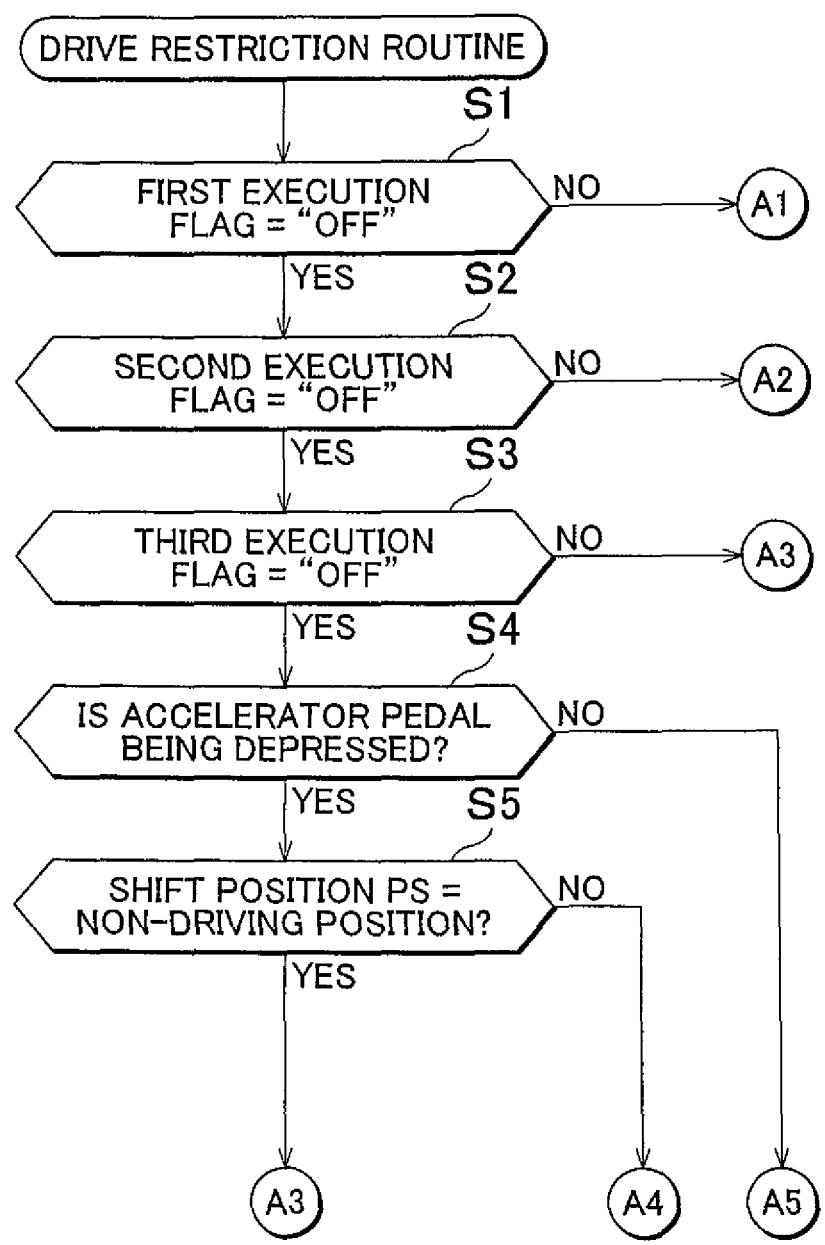
FIGS. 2A and 2B show a flowchart showing a first part of an execution procedure of a drive restriction routine according to the embodiment.

As shown in FIG. 2A, in this series of processes, firstly, it is determined whether or not a first execution flag is off (step S1). This first execution flag is set to on when a first drive force restriction process is being executed, and is set to off when the execution of the first drive force restriction process is halted. Therefore, the first execution flag is set to off in the initial control period.

Here, if the first execution flag is off (step S1: "YES"), it is determined that the first drive force restriction process is not being executed, and it is determined whether or not a second execution flag is off (step S2). This second execution flag is set to on when a second drive force restriction process is being executed, and is set to off when the execution of the second drive force restriction process is halted. Therefore, the second execution flag is set to off in the initial control period.

Here, if the second execution flag is off (step S2: "YES"), it is determined that the second drive force restriction process is not being executed, and it is determined whether or not a third execution flag is off (step S3). This third execution flag is set to on when a third drive force restriction process is being executed, and is set to off when the execution of the third drive force restriction process is halted. Therefore, the third execution flag is set to off in the initial control period.

Here, if the third execution flag is off (step S3: "YES"), it is determined that the third drive force restriction process is not being executed, and it is determined whether the circumstances are such that execution of any one of the first to third drive force restriction processes should be started. In other words, firstly, it is determined whether or not the accelerator pedal 7 is being depressed (step S4). Here, if the accelerator pedal 7 is not being depressed (step S4: "NO"), it is determined that the circumstances are not such that execution of any of the drive force restriction processes should be started, and hence this series of processes is temporarily terminated (see A7 that is depicted respectively in FIGS. 2A, 2B and 3).

On the other hand, if the accelerator pedal 7 is being depressed (step S4: "YES"), it is subsequently determined whether or not the shift position PS is a non-driving position (step S5). Here, if the shift position PS is a non-driving position (step S5: "YES"), it is determined that the shift position PS has not been switched and that the circumstances are not such that execution of any of the drive force restriction processes should be started, and this series of processes is temporarily terminated (see A3 indicated respectively in FIGS. 2A, 2B and 3).

On the other hand, if the shift position PS is not in a non-driving position (step S5: "NO"), it is subsequently determined whether or not the shift position PS has just been switched from the park position to a driving position (the drive position or the reverse position) (step S6).

Here, if the shift position PS has just been switched from the park position to a driving position (step S6: "YES"), the first execution flag is turned on so as to execute the first drive force restriction process (step S7). Thereupon, the first drive force restriction process is executed (step S8). In the first drive force restriction process, a drive force target value Ft is set in line with Formula (1).

$$Ff \leftarrow Fidle \quad (1)$$

In other words, the drive force target value Ft is set to a magnitude corresponding to idle, Fidle, regardless of the magnitude of the accelerator operation amount ACCP.

When the first drive force restriction process has been executed in this way, subsequently, a prescribed operation amount $\beta$ is set to a first operation amount $\beta 1$ (step S9). Here, the first operation amount $\beta 1$ is an accelerator operation amount ACCP equivalent to idle.

Furthermore, if the shift position PS has not just been switched from the park position to a driving position (step S6: "NO"), subsequently, it is determined whether or not the shift position PS has just been switched from the neutral position to a driving position (the drive position or the reverse position) (step S10).

Here, if the shift position PS has just been switched from the neutral position to a driving position (step S10: "YES"), subsequently, it is determined whether or not the continuation time $\Delta t$ of the neutral position is shorter than a prescribed time period $\alpha$ (step S11). The continuation time $\Delta t$ of the neutral position is the time period that elapses from the switching of the shift position PS to the neutral position until the switching of the shift position PS to the drive position, and this time period is calculated by the counting routine shown in FIG. 4.

Here, an execution procedure of a counting routine of the continuation time Δt of the neutral position is described with reference to FIG. 4. The series of processes shown in this flowchart are executed periodically by a time interrupt at prescribed time intervals, via the electronic control apparatus 5.

Figure 4:
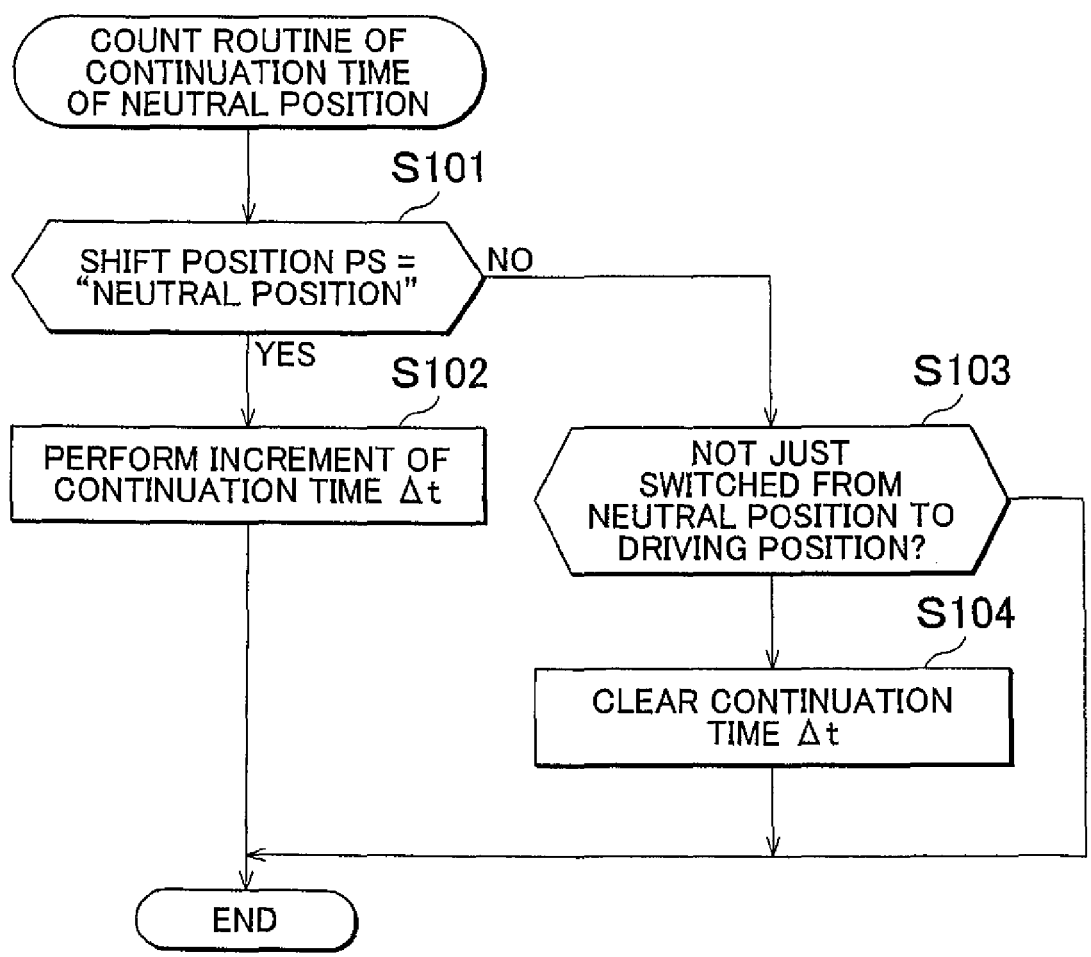
FIG. 4 is a flowchart showing an execution procedure of a count routine of continuation time of a neutral position according to the embodiment.

As shown in FIG. 4, in this series of processes, firstly, it is determined whether or not the shift position PS is the neutral position (step S101). Here, if the shift position is the neutral position (step S101: "YES"), subsequently, increment of the continuation time Δt is performed (step S102), and this series of processes is temporarily terminated.

On the other hand, if the shift position is not a neutral position (step S101: "NO"), subsequently, it is determined whether or not the shift position has just been switched from the neutral position to a driving position (step S103). More specifically, it is determined whether or not a negative determination has just been made in step S9 of the flowchart shown in FIG. 2B.

Here, if the shift position has just been switched from the neutral position to a driving position (step S103: "NO"), it is necessary to refer to the continuation time Δt of the determination process of step S11 of the flowchart shown in FIG. 2B, and therefore this series of processes is temporarily terminated without clearing the continuation time Δt.

On the other hand, if the shift position has not just been switched from the neutral position to a driving position (step S103: "YES"), the continuation time Δt is cleared (step S104), and this series of processes is temporarily terminated.

As described above, when the shift position PS is switched from the neutral position to a driving position, with the accelerator pedal 7 depressed, the depression of the accelerator pedal 7 may be an operation of starting the vehicle 1 from a temporary stationary state, or an operation of starting the vehicle 1 to get the vehicle 1 out of a muddy road. Here, if the depression of the accelerator pedal 7 is an operation of starting the vehicle 1 from a temporary stationary state, the continuation time Δt of the neutral position immediately before switching the shift position PS to the driving position becomes long. On the other hand, if the depression of the accelerator pedal 7 is an operation of starting the vehicle 1 to get the vehicle 1 out of a muddy road, the shift position PS is rapidly switched between the drive position and the reverse position, which are driving positions, in order to move the vehicle 1 backwards and forwards. Therefore, the continuation time Δt of the neutral position is shorter than in the case of an operation of starting the vehicle 1 from a temporary stationary state as described above. In this way, the circumstances of the vehicle 1, in which a start operation is performed, can be determined from the continuation time Δt of the neutral position. Incidentally, in the present embodiment, looking in particular at the difference in the mode of the depression of the accelerator pedal 7, the prescribed time period α in the determination process of step S11 of the flowchart shown in FIG. 2B is set to one second.

Figure 2B:
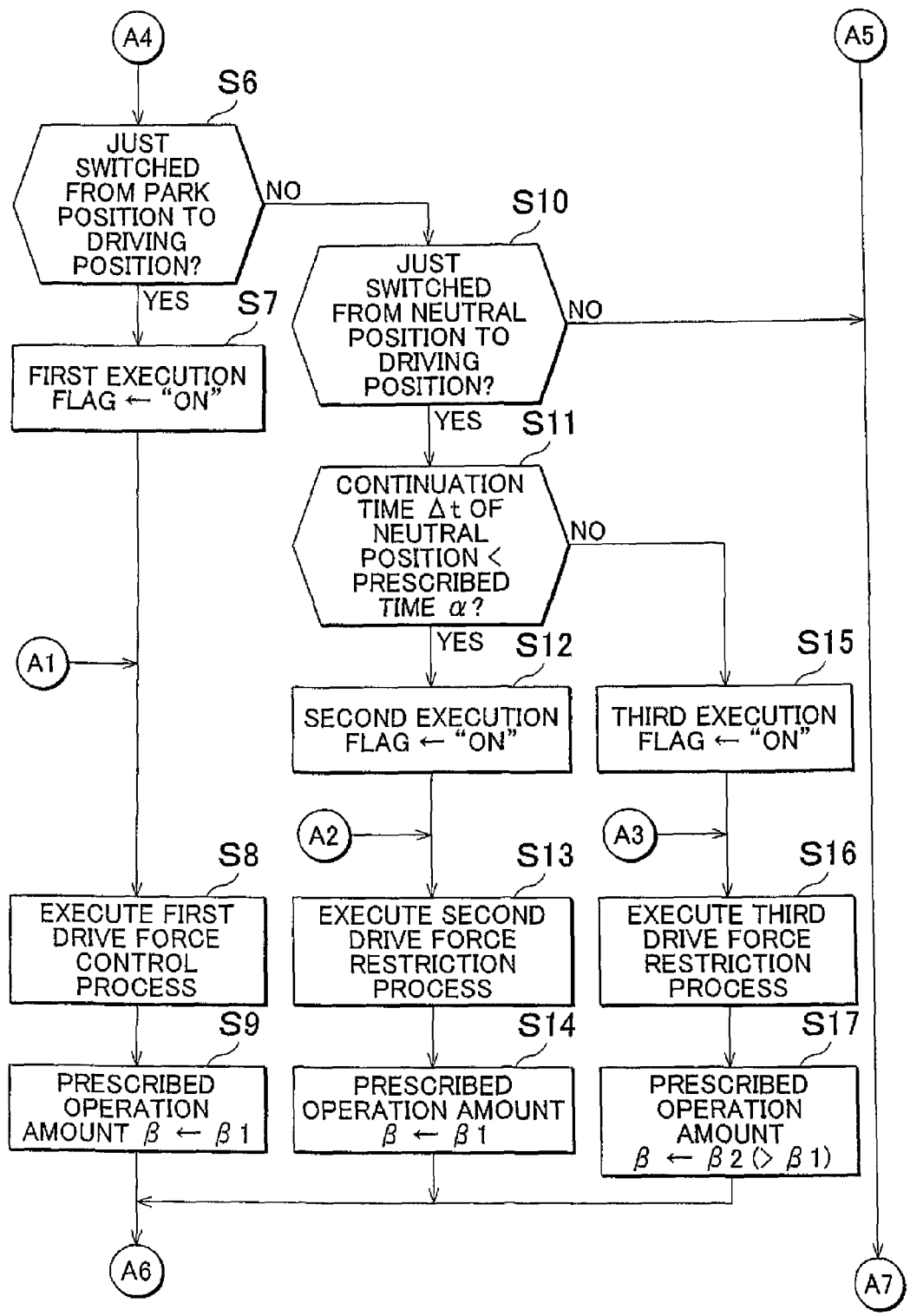

In step S11 in FIG. 2B, if the continuation time Δt of the neutral position is shorter than the prescribed time α (step S11: "YES"), the depression of the accelerator pedal 7 is determined to be an operation of starting the vehicle 1 to get the vehicle 1 out of a muddy road, and subsequently, the second execution flag is switched on in order to execute the second drive force restriction process (step S12). Thereupon, the second drive force restriction process is executed (step S13).

Figure 5:
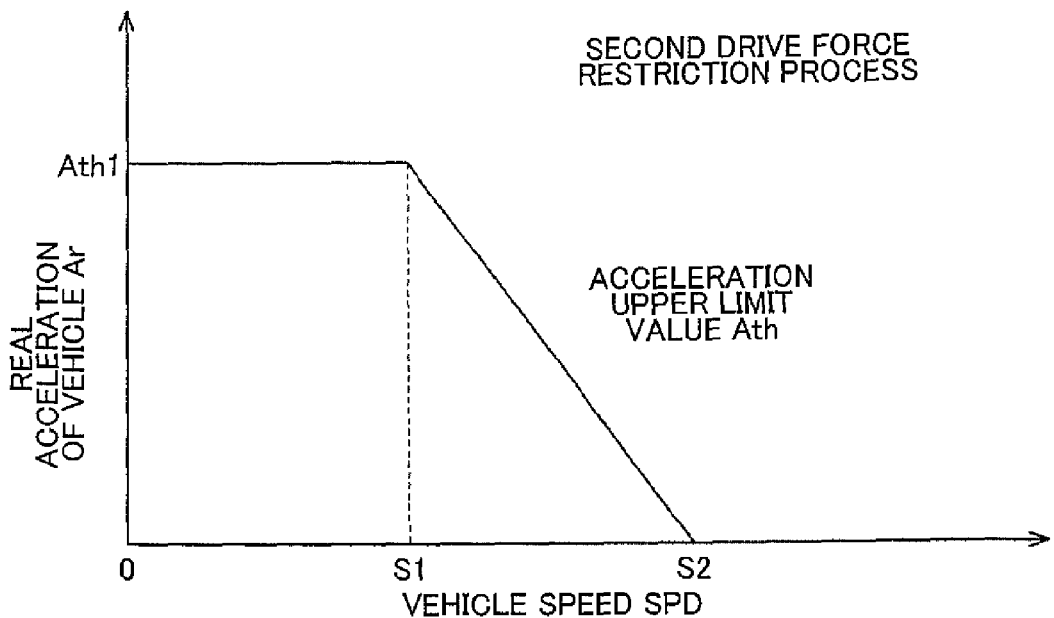
FIG. 5 is a graph showing a relationship between vehicle speed, vehicle acceleration and an acceleration upper limit of the embodiment, this graph being employed when the continuation time of the neutral position is shorter than a prescribed time.

The second drive force restriction process is a process of reducing the drive force output from the internal combustion engine 2 while maintaining the drive force at or above a value that allows the vehicle to get out of a muddy road. In this process, an acceleration upper limit value Ath that is an upper limit value of the real acceleration Ar of the vehicle is set on the basis of the vehicle speed SPD. More specifically, as shown in FIG. 5, the acceleration upper limit value Ath is set to a first upper limit value Ath1 (constant), from a vehicle speed SPD of "0" up to a first prescribed speed S1, and in a range of the vehicle speed SPD from the first prescribed speed S1 to a second prescribed speed S2, the acceleration upper limit value Ath is reduced as the vehicle speed SPD increases. Furthermore, when the speed SPD is equal to or greater than the second prescribed speed S2, the acceleration upper limit value Ath is set to "0". This relationship between the speed SPD and the acceleration upper limit value Ath is set in advance based on experiments, or the like, in such a manner that the drive force output from the internal combustion engine 2 is reduced while maintaining the drive force at or above a value that allows the vehicle to get out of a muddy road.

When the acceleration upper limit value Ath has been set in this way, subsequently, a reduction amount ΔF is set on the basis of the real acceleration Ar and the acceleration upper limit value Ath in this case. Incidentally, the real speed Ar of the vehicle is calculated on the basis of the detection results of the speed SPD. The reduction amount ΔF described above is a correction amount for reducing the drive force target value Ft, which is a control target value of the drive force output from the internal combustion engine 2, in such a manner that the real acceleration Ar becomes the acceleration upper limit value Ath, when the real acceleration Ar is greater than the acceleration upper limit value Ath. In other words, when the real acceleration Ar is greater than the acceleration upper limit value Ath, the greater the difference between the real acceleration Ar and the acceleration upper limit value Ath is, the larger value the reduction amount ΔF is set to. If the real acceleration Ar is equal to or less than the acceleration upper limit value Ath, the reduction amount ΔF is set to "0".

When the reduction amount ΔF has been set in this way, the drive force target value Ft is set in accordance with Formula (2).

$$Ft \leftarrow Faccp - \Delta F \quad (2)$$

In other words, the drive force target value Ft is set to a value obtained by subtracting the reduction amount ΔF from a required drive force value Faccp that is set on the basis of the accelerator operation amount ACCP. Next, the internal combustion engine 2 is controlled on the basis of this drive force target value Ft.

When the second drive force restriction process has been executed in this way, subsequently, the prescribed operation amount β is set to a first operation amount β1 (step S14). Here, the first operation amount β is an accelerator operation amount ACCP equivalent to idle.

On the other hand, in step S11, if the continuation time Δt of the neutral position is equal to or greater than the prescribed time α (step S11: "NO"), the depression of the accelerator pedal 7 is determined to be an operation of starting the vehicle 1 from a temporary stationary state, and subsequently, the third execution flag is switched on in order to execute the third drive force restriction process (step S15). Thereupon, the third drive force restriction process is executed (step S16).

Figure 6:
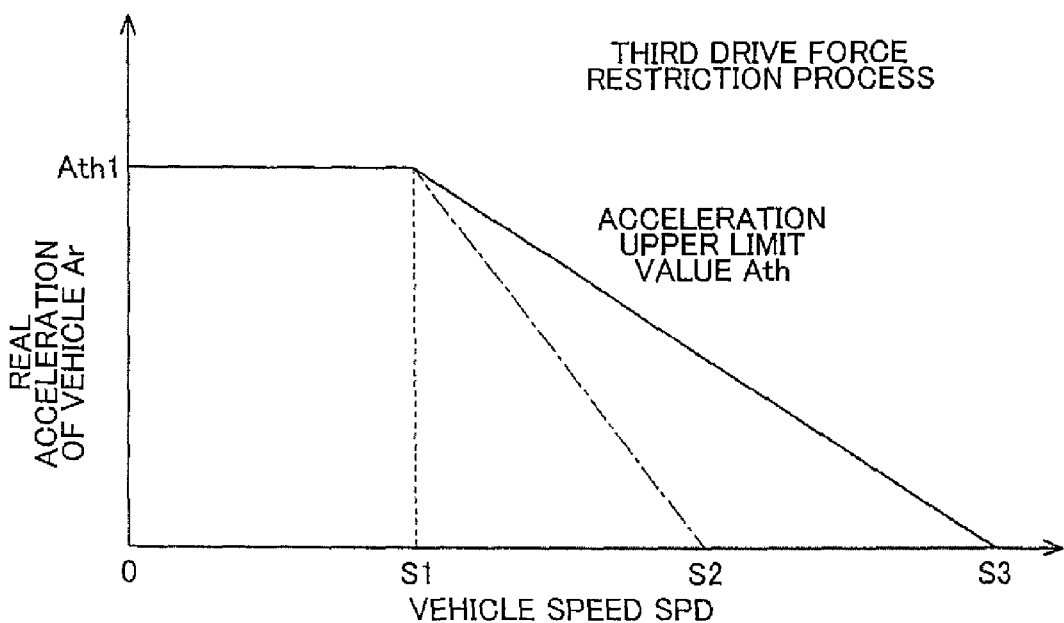
FIG. 6 is a graph showing a relationship between vehicle speed, vehicle acceleration and an acceleration upper limit of the embodiment, this graph being employed when the continuation time of the neutral position is equal to or greater than the prescribed time.

In the third drive force restriction process, an acceleration upper limit value Ath, which is an upper limit of the real acceleration Ar of the vehicle, is set on the basis of the vehicle speed SPD at that time, in essentially similar fashion to the second drive force restriction process. Specifically, as shown in FIG. 6, the acceleration upper limit value Ath is set to a first upper limit value Ath1 (constant) from a vehicle speed SPD of "0" up to a first prescribed speed S1. In the second drive force restriction process, in a range of the vehicle speed SPD from the first prescribed speed S1 to a third prescribed speed S3 (>S2) that is larger than the second prescribed speed S2, the acceleration upper limit value Ath is reduced as the speed SPD increases. Furthermore, when the speed SPD is equal to or greater than the third prescribed speed S3, the acceleration upper limit Ath is set to "0". This relationship between the speed SPD and the acceleration upper limit Ath is set in advance based on experiments, or the like, in such a manner that the amount of reduction of the drive force output from the internal combustion engine 2 is reduced as compared to the second drive force restriction process.

When the acceleration upper limit value Ath has been set in this way, subsequently, the reduction amount $\Delta F$ is set on the basis of the real acceleration Ar and the acceleration upper limit value Ath at that time, and a drive force target value Ft is set in accordance with Formula (2) above similarly to the second drive force restriction process. Next, the internal combustion engine 2 is controlled on the basis of this drive force target value Ft.

When the third drive force restriction process has been executed in this way, subsequently, the prescribed operation amount $\beta$ is set to a second operation amount $\beta 2$ (>$\beta 1$) that is greater than the first operation amount $\beta$ (step S17). On the other hand, in step S10, if the shift position PS has not just been switched from the neutral position to a driving position (step S10: "NO"), this series of processes is temporarily terminated (see A7 indicated respectively in FIGS. 2A, 2B and 3). This is because although the accelerator pedal 7 is depressed, the depression is carried out after switching the shift position PS from a non-driving position to a driving position, and the circumstances of the vehicle are not such that execution of any of the drive force restriction processes should be started.

Figure 3:
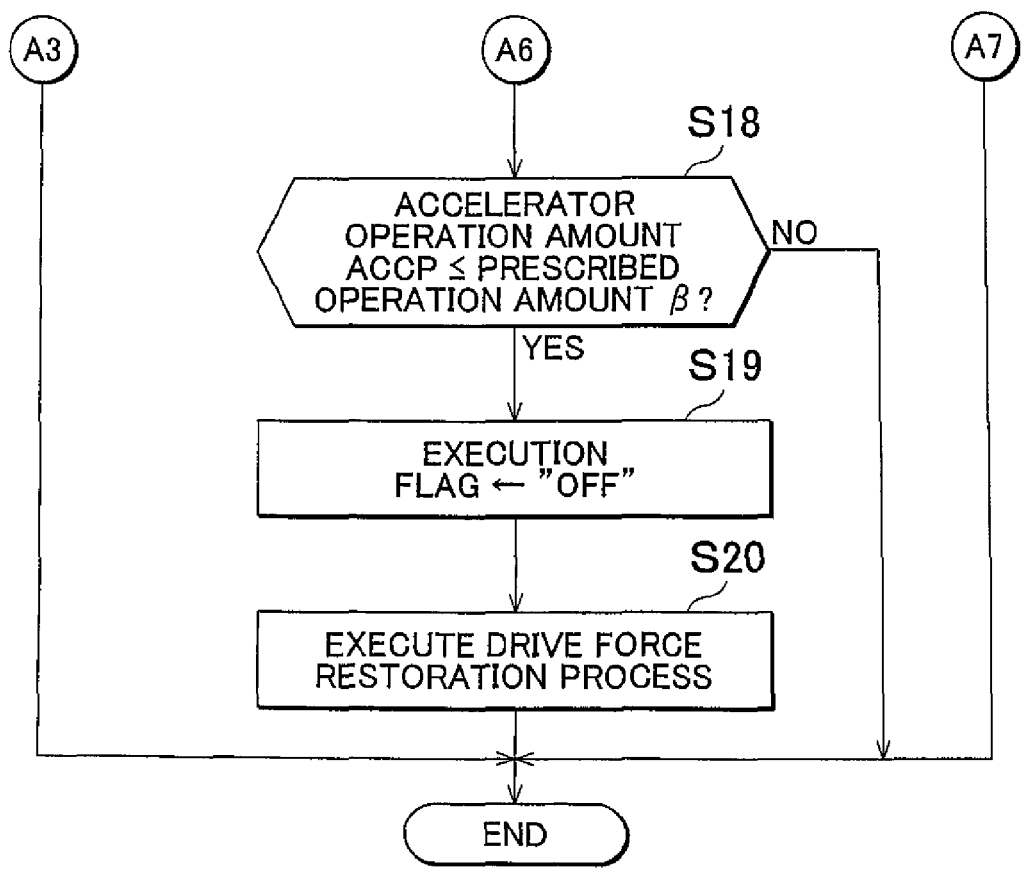
FIG. 3 is a flowchart showing a second part of the execution procedure of the drive restriction routine according to the embodiment.

When the prescribed operation amount $\beta$ has been established in steps S9, S14 and S17, subsequently, as shown in FIG. 3, it is determined whether or not execution of a drive force restoration process should be started. A drive force restoration process is a process of stopping the drive force restriction process that is currently being executed and restoring the drive force output from the internal combustion engine 2. More specifically, it is determined whether or not the accelerator operation amount ACCP has fallen and become equal to or lower than the prescribed operation amount $\beta$ (step S18). Here, if the accelerator operation amount ACCP is not equal to or lower than the prescribed operation amount $\beta$ (step S18: "NO"), it is determined that execution of the current drive force restriction process should be continued and that the circumstances are not such that execution of the drive force restoration process should be started, and this series of processes is temporarily terminated.

On the other hand, if the accelerator operation amount ACCP is equal to or lower than the prescribed operation amount $\beta$ (step S18: "YES"), the execution flag corresponding to the drive force restriction process currently being executed is set to off so that the execution of the drive force restriction process is stopped (step S19). Thereupon, the drive force restoration process is executed (step S20), and this series of processes is temporarily terminated.

In the drive force restoration process, the drive force target value Ft is gradually changed from a value set by Formula (1) or Formula (2) above to a value set by Formula (3) below.

$$Ft \leftarrow F accp \quad (3)$$

More specifically, the drive force target value Ft is gradually changed to the required drive force value Faccp set on the basis of the accelerator operation amount ACCP, and the internal combustion engine 2 is controlled on the basis of this drive force target value Ft.

Next, the operation of the present embodiment will be described. When the shift position PS is switched from a non-driving position to a driving position with the accelerator pedal 7 depressed, one of the first to third drive force restriction processes of reducing the drive force output from the internal combustion engine 2 is executed. Here, in executing the drive force restriction process, if the switching of the shift position PS is from the neutral position, the drive force reduction mode in the drive force restriction process is changed in accordance with the continuation time $\Delta t$ of the neutral position, and therefore the reduction amount of the drive force is adjusted in accordance with the circumstances of the vehicle 1. Consequently, the occurrence of excess or deficiency in the mode of reducing drive force depending on the circumstances of the vehicle 1 is prevented in the drive force restriction process, and it is possible to suppress giving an uncomfortable feeling to the driver.

More specifically, if the continuation time $\Delta t$ of the neutral position is shorter than the prescribed time $\alpha$, it is determined that the depression of the accelerator pedal 7 is an operation of starting the vehicle 1 to get the vehicle 1 out of a muddy road, and the drive force output from the internal combustion engine 2 is reduced while maintaining the drive force at or above a value enough to get the vehicle out of a muddy road (second drive force restriction process). Therefore, the drive force output from the internal combustion engine 2 is not increased suddenly, and it is possible to suppress giving an uncomfortable feeling to the driver. Furthermore, by setting the drive force output from the internal combustion engine 2 to a value enough to get the vehicle out of a muddy road, excessive reduction of the drive force is prevented in such a manner that the vehicle can get out of the muddy road rapidly.

Furthermore, if the continuation time $\Delta t$ of the neutral position is equal to or greater than the prescribed time $\alpha$, it is determined that the depression of the accelerator pedal 7 is an operation of starting the vehicle 1 from a temporary stationary state in an intersection, for example, and the amount of reduction of the drive force output from the internal combustion engine 2 is reduced as compared to a case where the continuation time $\Delta t$ of the neutral position is shorter than the prescribed time $\alpha$ described above (third drive force restriction process). Therefore, shortfall in the drive force when starting the vehicle 1 from a temporary stationary state is prevented.

Moreover, if the accelerator operation amount ACCP falls and becomes equal to or lower than the prescribed operation amount $\beta$ during the execution of the drive force restriction process, the execution of the drive force restriction process is terminated, and a drive force restoration process of restoring the drive force output from the internal combustion engine 2 is executed. Consequently, the drive force output from the internal combustion engine 2 is controlled to a magnitude that corresponds to the accelerator operation amount ACCP.

However, if the operation of the accelerator pedal 7 is an operation of starting the vehicle 1 to get the vehicle 1 out of a muddy road, it is necessary to prevent the first drive force restriction process from being terminated too early due to light operation of the accelerator pedal 7 by the driver. Therefore, it is necessary to set a strict condition for the execution of the drive force restoration process, such as a condition that the accelerator operation amount ACCP has become an idle equivalent amount.

Furthermore, if the conditions for executing the drive force restoration process are made universal so as to correspond to the case of an operation of starting the vehicle 1 to get the vehicle 1 out of a muddy road, regardless of the circumstances of the vehicle 1, the following situation can be brought about in cases where the operation of the accelerator pedal 7 is an operation of starting the vehicle 1 from a temporary stationary state. Specifically, when starting the vehicle 1 from a temporary stationary state, the second drive force restriction process cannot be terminated and a drive force restoration process cannot be executed until strict execution conditions such as those described above have been established. Therefore, especially in cases where the driver is in a hurry, the drive force restoration process is not readily executed, and hence the driver may be made more upset.

In respect of this point, in the present embodiment, when the switching of the shift position is from the neutral position, the prescribed operation amount $\beta$ is made larger in cases where the continuation time $\Delta t$ of the neutral position is equal to or greater than the prescribed time $\alpha$, than in cases where $\Delta t$ is shorter than the prescribed time $\alpha$. Consequently, the likelihood of executing the drive force restoration process changes according to the circumstances of the vehicle 1, and the driver is suitably prevented from being made upset when the drive restoration process is executed.

The electronic control apparatus 5 functions as a control unit in the invention, and the shift lever 9 functions as a shift mechanism in the invention. According to the drive control apparatus for a vehicle of the present embodiment described above, the following beneficial effects are obtained.

(1) The electronic control apparatus 5 executes a drive force restriction process of reducing the drive force output from the internal combustion engine 2 when the shift position PS is switched from a non-driving position to a driving position with the accelerator pedal 7 depressed. Furthermore, when executing the drive force restriction process, if the switching of the shift position PS is from a neutral position that is a non-driving position, the mode of reducing the drive force is changed in accordance with the continuation time $\Delta t$ of the neutral position. By adopting this configuration, it is possible to reliably suppress giving an uncomfortable feeling to the driver when the shift position PS is switched from a non-driving position to a driving position with the accelerator pedal 7 depressed.

(2) If the continuation time $\Delta t$ of the neutral position is shorter than the prescribed time $\alpha$, it is determined that the depression of the accelerator pedal 7 is an operation of starting the vehicle 1 to get the vehicle 1 out of a muddy road, and the drive force output from the internal combustion engine 2 is reduced while maintaining the drive force at or above a value enough to get the vehicle out of a muddy road (second drive force restriction process). By adopting this configuration, it is possible to suppress giving an uncomfortable feeling to the driver when the shift position PS is switched from a non-driving position to a driving position with the accelerator pedal 7 depressed and it is facilitated to get out of the muddy road quickly.

(3) If the continuation time $\Delta t$ of the neutral position is equal to or greater than the prescribed time $\alpha$, it is determined that the depression of the accelerator pedal 7 is an operation of starting the vehicle 1 from a temporary stationary state, and the amount of reduction of the drive force output from the internal combustion engine 2 is reduced as compared to a case where the continuation time $\Delta t$ of the neutral position is shorter than the prescribed time $\alpha$ described above (third drive force restriction process). By adopting this configuration, it is possible to suitably suppress giving an uncomfortable feeling to the driver when starting the vehicle 1 from a temporary stationary state, when the shift position PS is switched from a non-driving position to a driving position with the accelerator pedal 7 depressed.

(4) If the accelerator operation amount ACCP is reduced and becomes equal to or lower than the prescribed operation amount $\beta$ during the execution of the drive force restriction process, the execution of the drive force restriction process is terminated, and a drive force restoration process of restoring the drive force output from the internal combustion engine 2 is executed. Furthermore, when the switching of the shift position is from the neutral position, the prescribed operation amount $\beta$ is made larger in cases where the continuation time $\Delta t$ of the neutral position is equal to or greater than the prescribed time $\alpha$, than in cases where $\Delta t$ is shorter than the prescribed time $\alpha$. By adopting this configuration, it is possible to determine the circumstances of the vehicle 1 by a simple mode, on the basis of the results of a comparison between the continuation time $\Delta t$ of the neutral position and the prescribed time $\alpha$, and the likelihood of executing the drive force restoration process can be changed suitably in accordance with the circumstances of the vehicle 1. As a result, it is possible to suitably prevent the driver from being made upset when executing the drive force restoration process.

The drive control apparatus of the vehicle relating to the invention is not limited to the configuration described in the aforementioned embodiment, and can be implemented in suitably modified modes, such as the following, for example.

In the embodiment described above, in the first drive force restriction process, the drive force target value Ft is set to a magnitude equivalent to idle, Fidle, regardless of the magnitude of the accelerator operation amount ACCP, but the mode of execution of the first drive force restriction process is not limited to this. It suffices that the drive force target value Ft is smaller than the required drive force value Faccp set on the basis of the accelerator operation amount ACCP. The drive force target value Ft may be set to a value larger than the magnitude equivalent to idle, Fidle.

In the embodiment described above, an internal combustion engine 2 is described as an example of a prime mover serving as a drive power source for a vehicle 1. However, the prime mover relating to the invention is not limited to this and may be a prime mover consisting of both an internal combustion engine and an electric motor, or a prime mover consisting of an electric motor only.

In the embodiment described above, an accelerator pedal 7 is given as an example of an accelerator, but the accelerator is not limited to that to be operated by the driver's foot in this way. Apart from this, it is also possible to use an accelerator lever that is operated by the driver's hand, for example.

As described in the aforementioned embodiment, when the vehicle 1 is travelling backward, it is desirable to set the acceleration upper limit value Ath so that the greater the vehicle speed SPD is, the smaller the set acceleration upper limit value Ath is, in order to prevent the restriction of the drive force F output from the internal combustion engine 2 from becoming insufficient. However, the invention is not limited to a configuration, in which the acceleration upper limit value Ath is set variably in accordance with the vehicle speed SPD in this way, and the acceleration upper limit value may also be set to a fixed value, regardless of the vehicle speed SPD.

As in the embodiment described above, it is desirable to set the prescribed operation amount β, which is the condition for executing the drive force restoration process, variably in accordance with a prescribed time α in relation to the continuation time Δt of the neutral position, in order to change the likelihood of execution of the drive force restoration process suitably in accordance with the circumstances of the vehicle 1, and to suitably prevent making the driver upset when executing the drive force restoration process. However, the invention is not limited to this and the prescribed operation amount β can also be set to a fixed value, regardless of the continuation time Δt of the neutral position.

In the embodiment described above, the prescribed time α is set to one second (fixed value), but it is also possible to learn the shift position switching tendencies of the driver and to set the prescribed time variably on the basis of these tendencies. For example, if it is determined that the driver has a tendency to take a long time for each of the repeatedly performed switching operations of the shift position PS between the drive position and the reverse position, the prescribed time may be set to a time longer than one second.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The control unit may be configured to reduce the drive force output from the prime mover while maintaining the drive force at or above a value enough to get the vehicle out of a muddy road during execution of the drive force restriction process if the continuation time of the neutral position is shorter than a prescribed time.

According to this configuration, when the continuation time of the neutral position is shorter than a prescribed time, it can be considered that the operation of the accelerator to an on state is an operation of starting the vehicle to get the vehicle out of a muddy road, and the drive force output from the prime mover is therefore reduced while maintaining the drive force at or above a value enough to get the vehicle out of the muddy road. Therefore, the drive force output from the prime mover is not increased suddenly, and it is possible to suppress giving an uncomfortable feeling to the driver. Furthermore, by setting the drive force output from the prime mover to a value enough to get the vehicle out of a muddy road, excessive reduction of the drive force is prevented, so that the vehicle can get out of the muddy road quickly. Consequently, it is possible to suppress giving an uncomfortable feeling to the driver when the shift position is switched from a non-driving position to a driving position while the accelerator is in an on state, and at the same time, it is possible to get the vehicle out of a muddy road quickly. Incidentally, the prescribed time described above is set through experiments, or the like, and desirably the prescribed time is set to one second, for example.

The control unit may be configured to, during execution of the drive force restriction process, make an amount of reduction of the drive force output from the prime mover smaller when the continuation time of the neutral position is equal to or greater than the prescribed time as compared to the amount of reduction of the drive force when the continuation time of the neutral position is shorter than the prescribed time.

According to this configuration, when the continuation time of the neutral position is equal to or greater than the prescribed time, it can be considered that the operation of the accelerator to an on state is an operation of starting the vehicle from a temporary stationary state, at an intersection, for instance, and the amount of reduction of the drive force output from the prime mover is therefore made smaller than the t of reduction of the drive force performed when the continuation time of the neutral position is shorter than the prescribed time. Therefore, shortfall in the drive force when starting the vehicle from a temporary stationary state is prevented. Consequently, by adopting this configuration, it is possible to suitably suppress giving an uncomfortable feeling to the driver when starting the vehicle from a temporary stationary state, if the shift position is switched from a non-driving position to a driving position while the accelerator pedal is in an on state.

The control unit may be configured to terminate execution of the drive force restriction process and to execute a drive force restoration process of restoring the drive force output from the prime mover, when a prescribed condition is established during the execution of the drive force restriction process; and the control unit may be configured so that, when the switching of the shift position is from the neutral position, the control unit changes the prescribed condition in accordance with the continuation time of the neutral position.

According to this configuration, the control unit terminates execution of the drive force restriction process and executes a drive force restoration process of restoring the drive force output from the prime mover, when a prescribed condition is established during the execution of the drive force restriction process. Consequently, the drive force output from the prime mover is controlled to a magnitude that corresponds to the operation of an accelerator.

However, if the operation of the accelerator is an operation of starting the vehicle to get the vehicle out of a muddy road, it is necessary to prevent the drive force restriction process from being terminated too early due to light operation of the accelerator by the driver. Therefore, it is necessary to set a strict condition for the execution of the drive force restoration process, such as a condition that the accelerator operation amount has become an idle equivalent amount. Furthermore, if the condition for executing the drive force restoration process is made universal so as to correspond to the case of an operation of starting the vehicle to get the vehicle out of a muddy road regardless of the circumstances of the vehicle, the following situation can be brought about in cases where the operation of the accelerator is an operation of starting the vehicle from a temporary stationary state. Specifically, when starting the vehicle from a temporary stationary state, the drive force restriction process cannot be terminated and the drive force restoration process cannot be executed until a strict execution condition such as that described above has been established. Therefore, especially in cases where the driver is in a hurry, the drive force restoration process is not readily executed, and hence the driver may be made even more upset.

In this respect, according to the configuration described above, the prescribed condition that is the condition for execution of the drive force restoration process is changed in accordance with the continuation time of the neutral position, and therefore this prescribed condition is set in accordance with the circumstances of the vehicle. Consequently, the likelihood of executing the drive force restoration process changes according to the circumstances of the vehicle, and the driver is prevented from being made upset when the drive restoration process is executed.

The control unit may be configured to reduce the drive force output from the prime mover while maintaining the drive force at or above a value enough to get the vehicle out of a muddy road during execution of the drive force restriction process if the continuation time of the neutral position is shorter than a prescribed time; the control unit may be configured to, during execution of the drive force restriction process, make an amount of reduction of the drive force output from the prime mover smaller when the continuation time of the neutral position is equal to or greater than the prescribed time as compared to the amount of reduction of the drive force when the continuation time of the neutral position is shorter than the prescribed time; and the control unit may be configured to relax the prescribed condition when the continuation time of the neutral position is equal to or greater than the prescribed time as compared to the prescribed condition when the continuation time of the neutral position is shorter than the prescribed time.

According to this configuration, it is possible to determine the circumstances of the vehicle by a simple mode, on the basis of a result of comparison between the continuation time of the neutral position and the prescribed time. As a result, it is possible to suitably change the likelihood of executing a drive force restoration process in accordance with the circumstances of the vehicle.

The prescribed condition may be established when an operation amount of the accelerator is equal to or less a prescribed operation amount; and the prescribed operation amount may be made greater when the continuation time of the neutral position is equal to or greater than the prescribed time as compared to the prescribed operation amount when the continuation time of the neutral position is shorter than the prescribed time.

The prescribed condition that is a condition for execution of the drive force restoration process is desirably established when the accelerator operation amount is equal to or less than a prescribed operation amount, as in the configuration described above. In this case, by making the prescribed operation amount described above greater when the continuation time of the neutral position is equal to or greater than a prescribed time, as compared to the prescribed operation amount when the continuation time is shorter than the prescribed time, as in the configuration described above, it is possible easily to implement the configuration, in which the prescribed condition is relaxed when the continuation time of the neutral position is equal to or greater than the prescribed time, as compared to the prescribed condition when the continuation time is shorter than the prescribed time.

What is claimed is:

1. A drive control apparatus for a vehicle, comprising:
a control unit that is configured to control drive force output from a prime mover serving as a drive power source of the vehicle, in accordance with operation of an accelerator; and
a shift mechanism capable of selectively switching a shift position to one of a driving position and a non-driving position, wherein:
the shift mechanism is configured to transmit the drive force from the prime mover to vehicle wheels when the shift position is in the driving position, and to interrupt transmission of the drive force from the prime mover to the vehicle wheels when the shift position is in the non-driving position;
the control unit is configured to execute a drive force restriction process of reducing the drive force output from the prime mover when the shift position is switched from the non-driving position to the driving position while the accelerator is in an on state; and
the control unit is configured so that, in executing the drive force restriction process, when the switching of the shift position is from the non-driving position, which is a neutral position, the control unit changes a mode of reducing the drive force in accordance with a continuation time of the neutral position, during which the shift position is in the neutral position;
the control unit is configured to terminate execution of the drive force restriction process and to execute a drive force restoration process of restoring the drive force output from the prime mover, when a prescribed condition is established during the execution of the drive force restriction process;
the control unit is configured so that, when the switching of the shift position is from the neutral position, the control unit changes the prescribed condition in accordance with the continuation time of the neutral position;
the control unit is configured to reduce the drive force output from the prime mover while maintaining the drive force at or above a value enough to get the vehicle out of a muddy road during execution of the drive force restriction process if the continuation time of the neutral position is shorter than a prescribed time;
the control unit is configured to, during execution of the drive force restriction process, set an acceleration upper limit value Ath in accordance with a vehicle speed so that, when the continuation time of the neutral position is equal to or greater than the prescribed time, in a range of the vehicle speed from a first prescribed speed S1 to a second prescribed speed S2, the acceleration upper limit value Ath is reduced as the vehicle speed increases, and, when the continuation time of the neutral position is shorter than the prescribed time, in a range of the vehicle speed from the first prescribed speed S1 to a third prescribed speed S3 that is larger than the second prescribed speed S2, the acceleration upper limit value Ath is reduced as the vehicle speed increases, to make an amount of reduction of the drive force output from the prime mover smaller when the continuation time of the neutral position is equal to or greater than the prescribed time as compared to the amount of reduction of the drive force when the continuation time of the neutral position is shorter than the prescribed time; and
the control unit is configured to change the prescribed condition to more easily execute the drive force restoration process, when the continuation time of the neutral position is equal to or greater than the prescribed time as compared to the prescribed condition when the continuation time of the neutral position is shorter than the prescribed time.

2. The drive control apparatus for the vehicle according to claim 1, wherein
the prescribed condition is established when an operation amount of the accelerator is equal to or less than a prescribed operation amount; and
the prescribed operation amount is made greater when the continuation time of the neutral position is equal to or greater than the prescribed time as compared to the prescribed operation amount when the continuation time of the neutral position is shorter than the prescribed time.

* * * * *